US010351311B2

United States Patent
Liu

(10) Patent No.: US 10,351,311 B2
(45) Date of Patent: Jul. 16, 2019

(54) STORAGE CONTAINER

(71) Applicant: Free-Free Industrial Corp., Taipei (TW)

(72) Inventor: Sheng-Yu Liu, Taipei (TW)

(73) Assignee: FREE-FREE INDUSTRIAL CORP., Taipei (TW)

( * ) Notice: Subject to any disclaimer, the term of this patent is extended or adjusted under 35 U.S.C. 154(b) by 184 days.

(21) Appl. No.: 15/377,978

(22) Filed: Dec. 13, 2016

(65) Prior Publication Data

US 2018/0065782 A1   Mar. 8, 2018

(30) Foreign Application Priority Data

Sep. 5, 2016   (TW) .............................. 105128688 A

(51) Int. Cl.
| | |
|---|---|
| A47J 47/10 | (2006.01) |
| B65D 43/16 | (2006.01) |
| B65D 25/06 | (2006.01) |
| B65D 85/34 | (2006.01) |
| B65D 85/36 | (2006.01) |
| B65D 81/26 | (2006.01) |
| B65D 43/02 | (2006.01) |
| B65D 51/16 | (2006.01) |

(52) U.S. Cl.
CPC ............ *B65D 43/161* (2013.01); *A47J 47/10* (2013.01); *B65D 25/06* (2013.01); *B65D 43/0218* (2013.01); *B65D 81/261* (2013.01); *B65D 81/262* (2013.01); *B65D 85/34* (2013.01); *B65D 85/36* (2013.01); *B65D 51/1683* (2013.01); *B65D 2543/00101* (2013.01); *B65D 2543/00296* (2013.01); *B65D 2543/00379* (2013.01); *B65D 2543/00509* (2013.01); *B65D 2543/00537* (2013.01); *B65D 2543/00555* (2013.01); *B65D 2543/00648* (2013.01); *B65D 2543/00694* (2013.01); *B65D 2543/00777* (2013.01); *B65D 2543/00805* (2013.01)

(58) Field of Classification Search
CPC ...... B65D 43/161; B65D 25/06; B65D 25/04; B65D 2543/00379; B65D 85/34; A47J 47/10

See application file for complete search history.

(56) References Cited

U.S. PATENT DOCUMENTS

| | | | |
|---|---|---|---|
| 6,543,387 B1* | 4/2003 | Stein .................... | A01K 1/0245 119/419 |
| 9,051,083 B1* | 6/2015 | Davis .................... | B65D 25/06 |
| 2004/0200845 A1* | 10/2004 | Watzke .................... | B65D 1/24 220/501 |

(Continued)

*Primary Examiner* — Andrew T Kirsch
*Assistant Examiner* — Don M Anderson
(74) *Attorney, Agent, or Firm* — Chung-Ming Shih; HDLS IPR Services

(57) ABSTRACT

A storage container includes a container body, a lid, and a dividing member. The container body defines an accommodating space that has a top opening. The lid is removably disposed on the container body, and has two covering sections that cooperatively cover the opening. Each one of the covering sections is independently operable to uncover a part of the opening. The dividing member is removably disposed in the accommodating space for dividing the accommodating space into two compartments.

12 Claims, 9 Drawing Sheets

(56) References Cited

U.S. PATENT DOCUMENTS

| | | | |
|---|---|---|---|
| 2006/0254948 A1* | 11/2006 | Herbert | A47J 47/02 206/518 |
| 2007/0131701 A1* | 6/2007 | Herbert | B65D 21/0233 220/826 |
| 2008/0190951 A1* | 8/2008 | Gallagher | B65D 21/0233 220/826 |
| 2013/0320008 A1* | 12/2013 | Fu | B08B 13/00 220/23.83 |
| 2015/0305571 A1* | 10/2015 | Hanson | A47J 47/10 220/501 |

* cited by examiner

STORAGE CONTAINER

CROSS-REFERENCE TO RELATED APPLICATION

This application claims priority of Taiwanese Patent Application No. 105128688, filed on Sep. 5, 2016.

FIELD

The disclosure relates to a storage container, and more particularly to a food storage container.

BACKGROUND

Food storage containers can be used to receive food, such as fruit, vegetables, or cookies, etc., for storage at home or for carrying the food around. A conventional food storage container typically includes a container body for receiving food therein and having a top opening, and a lid removably covering the top opening. In order to take out the food stored in the container body, the lid has to be separated from the container body with the top opening completely uncovered, which may be inconvenient to operate, especially when operating single-handedly. Moreover, freshness and texture of certain types of food are affected by air contact. The food stored in the conventional storage container is exposed to ambient air whenever the lid is separated from the container body. As such, all of the food received in the container body may get oxidized or damped at a relatively fast rate since the top opening has to be completely uncovered for taking out the food from the container body. Therefore, there is room for improvement of the conventional food storage container.

SUMMARY

Therefore, an object of the disclosure is to provide a storage container that can alleviate at least one of the drawbacks of the prior art.

According to the disclosure, the storage container includes a container body, a lid, and a dividing member.

The container body defines an accommodating space that has a top opening. The lid is removably disposed on the container body, and has two covering sections that cooperatively cover the opening. Each one of the covering sections is independently operable to uncover a part of the opening. The dividing member is removably disposed in the accommodating space for dividing the accommodating space into two compartments.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
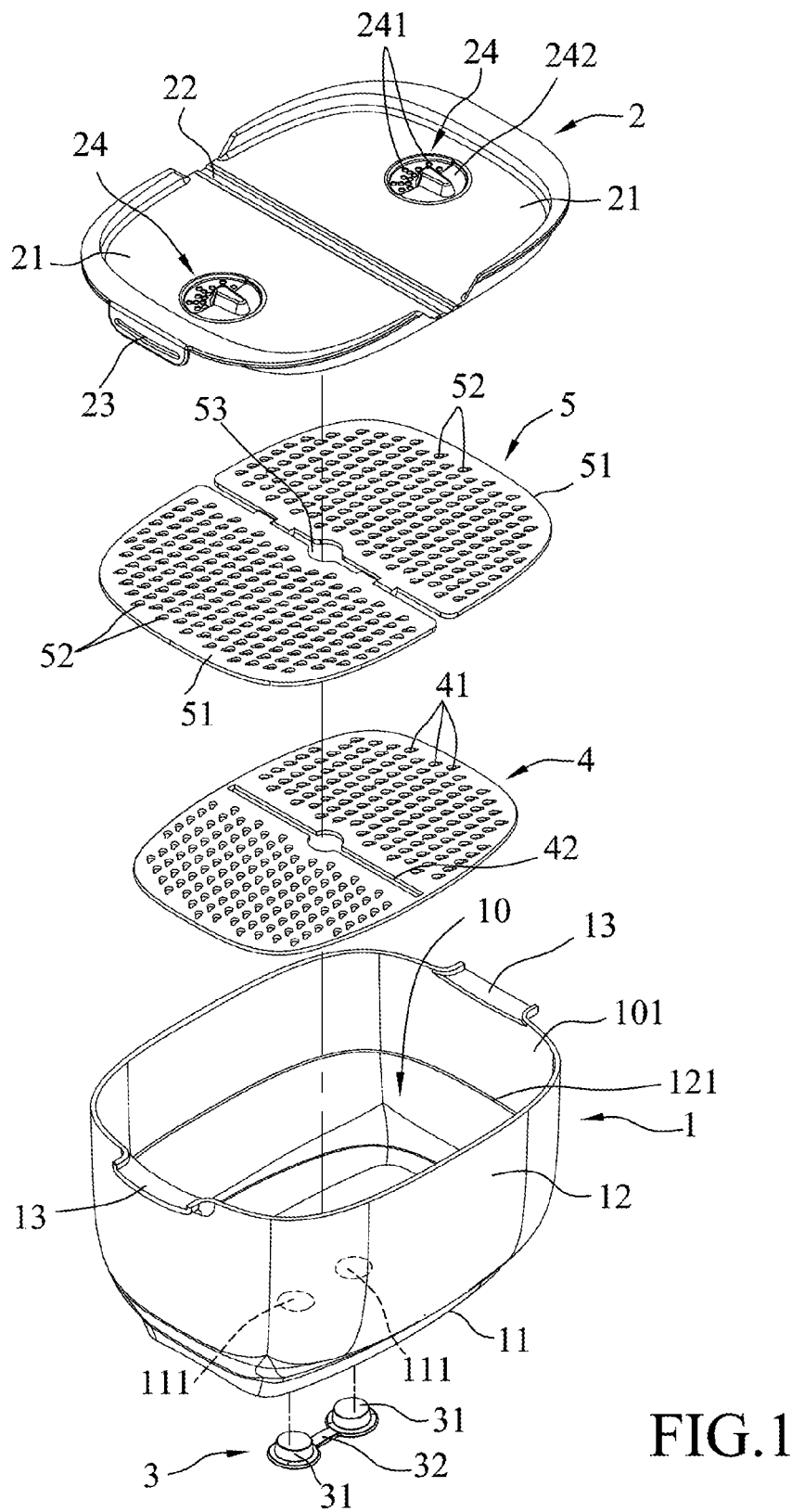
FIG. 1 is an exploded perspective view illustrating a first embodiment of a storage container according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
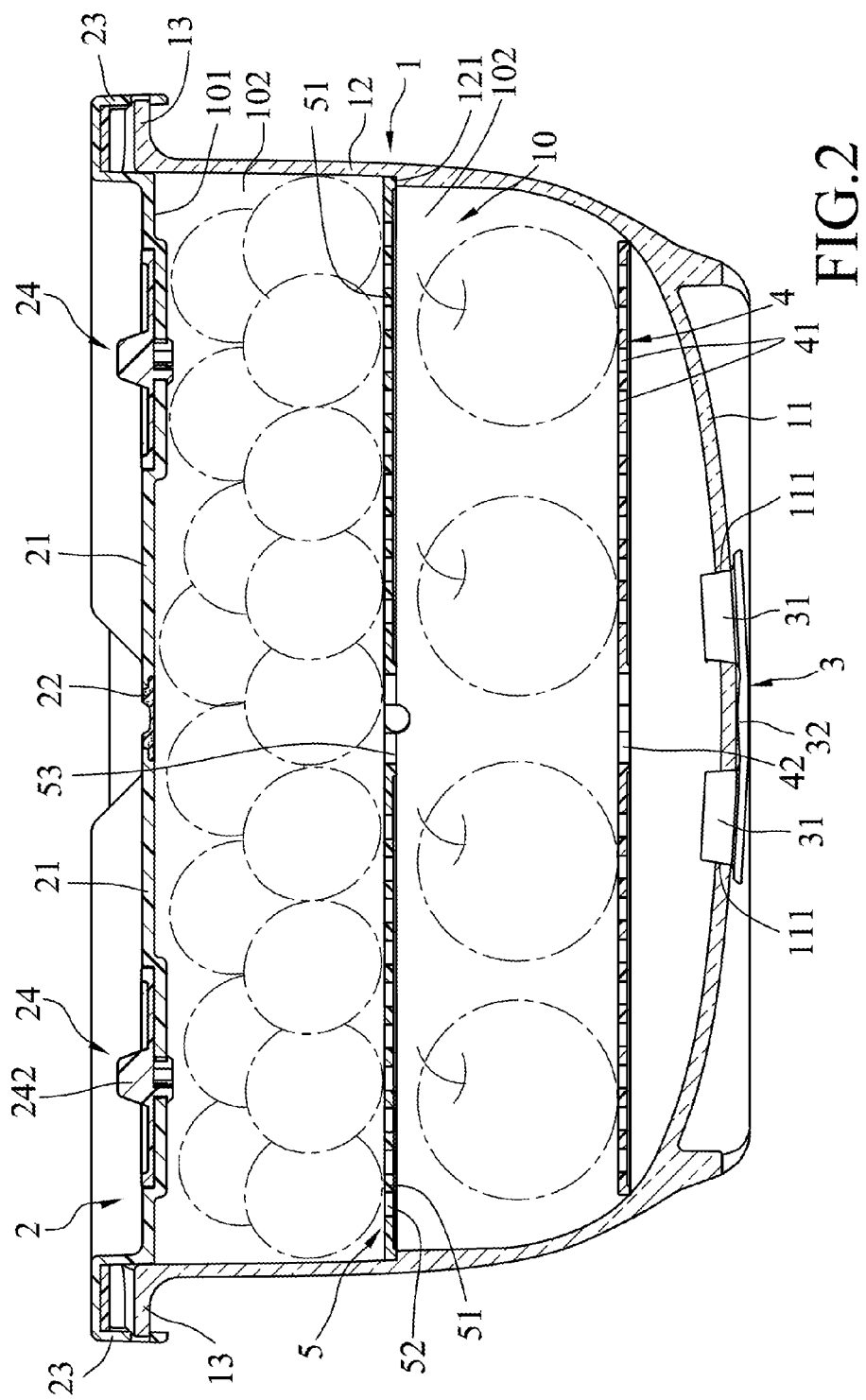
FIG. 2 is a partly sectional side view of the first embodiment, illustrating a dividing member of the storage container at a first position.
Figure 3:
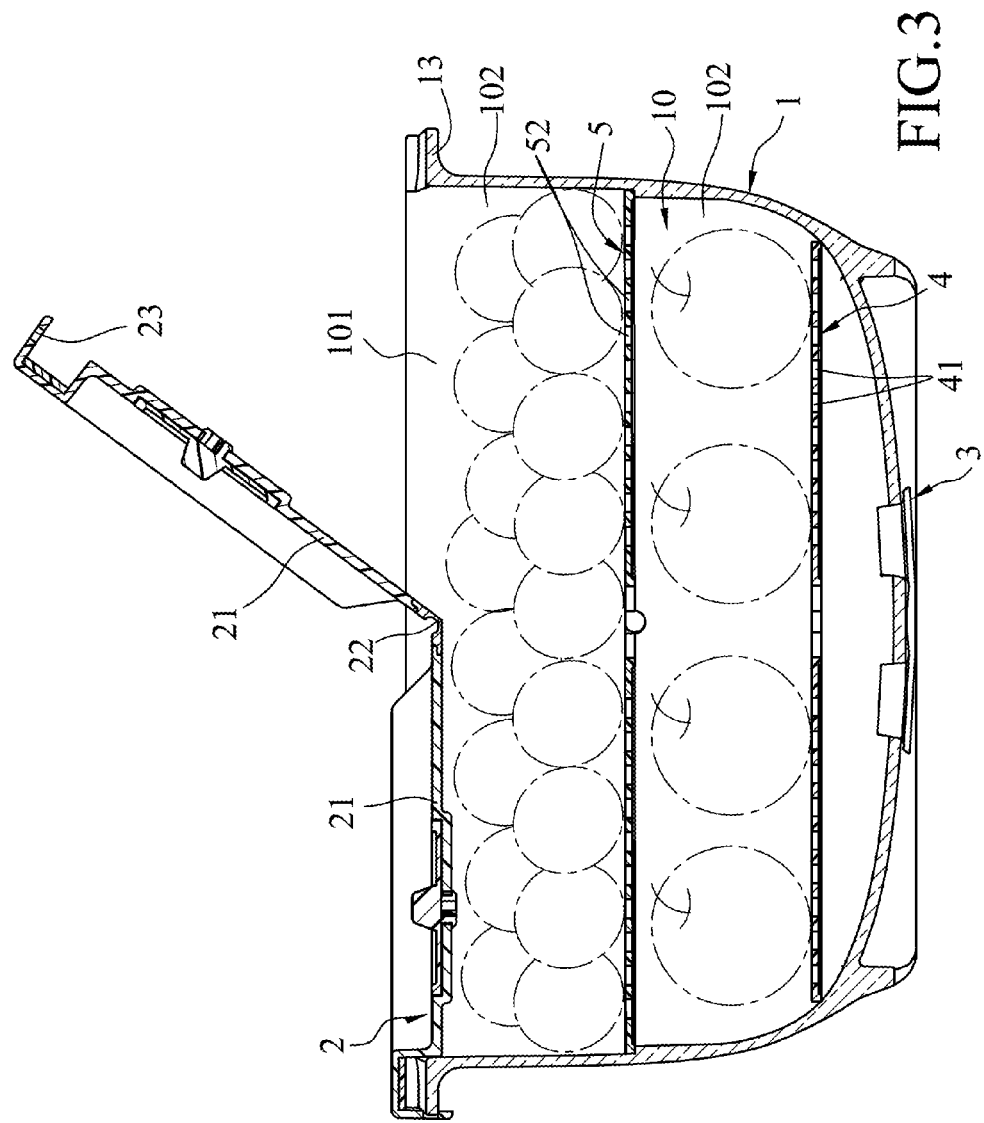
FIG. 3 is another partly sectional side view of the first embodiment, illustrating the dividing member at the first position and a covering section of a lid being flipped open.

Referring to FIGS. 1 to 3, a first embodiment of a storage container is used for storing food such as fruit, vegetable, cookies, etc. The storage container includes a container body 1, a lid 2, a seal member 3, a dividing member 5, and a support plate 4.

The container body 1 may be made of a plastic material, such as transparent Acrylonitrile-Styrene resin (AS resin). The container body 1 includes a base wall 11 that has two spaced-apart bottom holes 111 extending through top and bottom surfaces of the base wall 11, a surrounding wall 12 that extends upwardly from the base wall 11, and two first engaging portions 13 that respectively protrude from opposite lateral sides of said surrounding wall 12. The base wall 11 and the surrounding wall 12 cooperatively define an accommodating space 10 that has a top opening 101. The container body 1 further includes an inner protrusion 121 formed on an inner surface of the surrounding wall 12.

The lid 2 is removably disposed on the container body 1, and has two covering sections 21, a flexible connecting strip 22, two second engaging portions 23, and two ventilation control units 24.

The covering sections 21 cooperatively cover the opening 101 and may be made of a plastic material. In this embodiment, the covering sections 21 are made of AS resin. Each one of the covering sections 21 is independently operable to uncover a part of the opening 101.

The connecting strip 22 may be made of a flexible material such as thermoplastic polyurethane (TPU). The connecting strip 22 interconnects the covering sections 21 such that each of the covering sections 21 can be flipped open relative to the connecting strip 22. More specifically, the connecting strip 22 extends in a front-rear direction, and has two lateral sides respectively connected to the covering sections 21. In other embodiments, the connecting strip 22 may be substituted by a structure with a hinge function, e.g., a hinge, for interconnecting the covering sections 21.

It should be noted that the lid 2 is a one-piece structure. That is, the lid 2 is integrally formed as one piece by having the above-mentioned components of the lid 2 being directly connected to each other, such that the lid 2 can be separated from the container body 1 as a single piece.

The second engaging portions 23 are spaced apart from each other. Each of the second engaging portions 23 is connected a side of a respective one of the covering sections 21, and is fittingly engageable with a respective one of the first engaging portions 13 of the container body 1 so that the lid 2 is securely and removably disposed on the container body 1. Such quick-release design facilitates covering and uncovering of the opening 101.

Each of the ventilation control units 24 is disposed on a respective one of the covering sections 21, and has a plurality of air vents 241 extending through top and bottom surfaces of the respective one of the covering sections 21, and a vent-covering member 242 rotatably disposed on the respective one of the covering sections 21 and operable for covering and uncovering the air vents 241.

The seal member 3 removably and sealingly covers the bottom holes 111, and is made of silica gel. The seal member 3 has two spaced-apart sealing portions 31 and an elongated bridging portion 32. The sealing portions 31 removably, sealingly, and respectively cover the bottom holes 111. The elongated bridging portion 32 interconnects the sealing portions 31.

Figure 4:
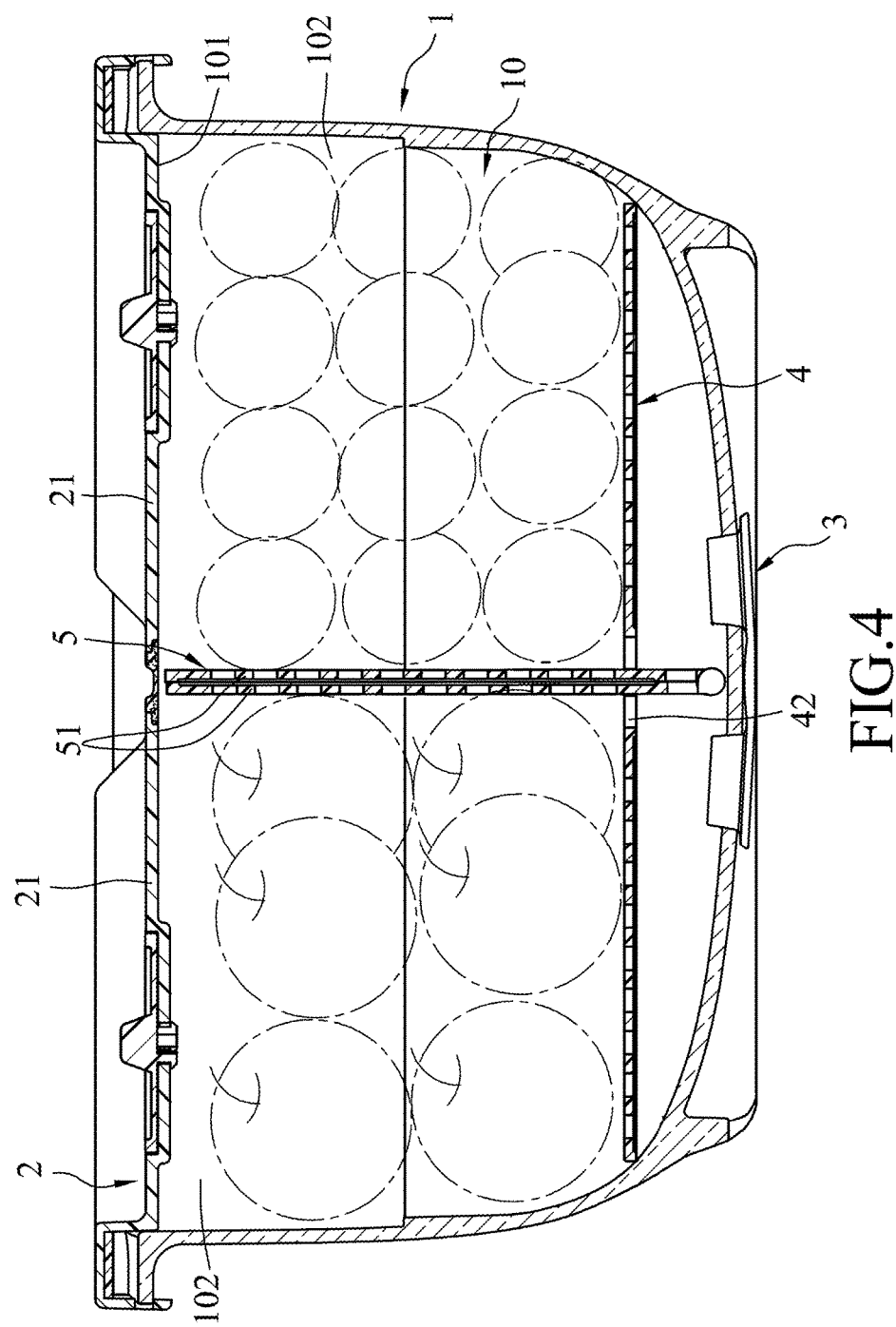
FIG. 4 is another partly sectional side view of the first embodiment, illustrating the dividing member at a second position.

With further reference to FIG. 4, the dividing member 5 is removably disposed in the accommodating space 10 for dividing the accommodating space 10 into two compartments 102. In this embodiment, the dividing member 5 is configured as a plate, and may be made of aplastic material such as polypropylene (PP). In greater detail, the dividing member 5 has two plate sections 51 that are connected to each other such that the dividing member 5 is foldable in a manner that the plate sections 51 overlap each other. For example, the plate sections 51 may be hinged together. The dividing member 5 is displaceable between a first position (see FIG. 2), where the dividing member 5 is supported by the inner protrusion 121 of the surrounding wall 12 and extends horizontally in the accommodating space 10 such that the compartments 102 are respectively formed on top and bottom sides of the dividing member 5, and a second position (see FIG. 4), where the dividing member 5 is folded and is vertically disposed in the accommodating space 10 such that the compartments 102 are respectively formed on two lateral sides of the dividing member 5. The dividing member 5 is formed with a plurality of perforations 52 that spatially communicate the compartments 102. The dividing member 5 is further formed with an extending hole 53 at an intersection of the plate sections 51 for access of a user's finger to remove the dividing member 5 out of the accommodating space 10 when the dividing member 5 is at the first position.

The support plate 4 is substantially flat, is disposed above the base wall 11 of the container body 1 and extends horizontally in the accommodating space 10, and may be made of a plastic material such as polypropylene. The support plate 4 is formed with a plurality of through holes 41 which extend through top and bottom surfaces of the support plate 4, and a slit 42 through which the dividing member 5 vertically extends when the dividing member 5 is at the second position.

Referring to FIGS. 2 and 3, when in use, first the support plate 4 is placed above the base wall 11 of the container body 1 for receiving food thereon. When it is desired to divide the accommodating space 10 into two compartments 102 for storage of a different kind of food, the dividing member 5 can be placed in the accommodating space 10 with the inner protrusion 121 supporting the dividing member 5 to be at the first position for receiving the different kind of food thereon. Next, the lid 2 is used to cover the opening 101 with the second engaging portions 23 of the lid 2 securely and respectively engaging the first engaging portions 13 of the container body 1.

As shown in FIG. 3, when it is desired to take out the food from the container body 1, anyone of the covering sections 21 of the lid 2 can be flipped open by disengaging the respective first and second engaging portions 13, 23 to uncover a part of the opening 101. That is, instead of removing the entire lid 2 from the container body 1, food can be conveniently taken out from the accommodating space 10 by flipping open only one of the covering sections 21. Moreover, the dividing member 5 can be easily and conveniently taken out of the accommodating space 10 by placing a finger through the extending hole 53 and then lifting the entire dividing member 5 upward.

Figure 5:
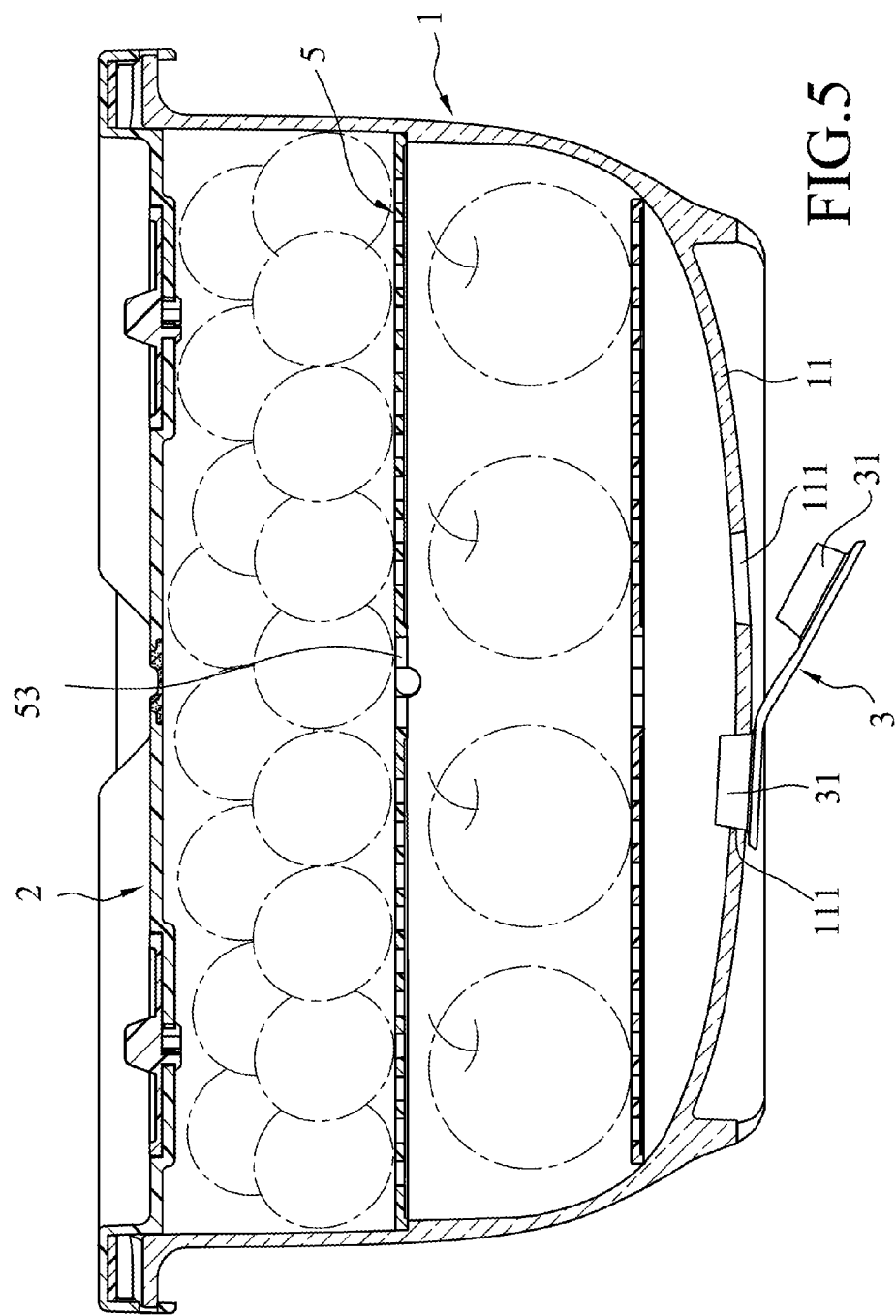
FIG. 5 is a view similar to FIG. 2, but illustrating a sealing portion of a seal member of the first embodiment being separated from a bottom hole.

It is worth mentioning that when the storage container is used to store washed or sliced fruit and vegetables, water or juice of the fruit and vegetables may drip down onto the base wall 11 of the container body 1 through the perforations 52 of the dividing member 5 and the through holes 41 of the support plate 4. The support plate 4 prevents the food received thereon from getting into contact with the water, thereby effectively preventing deterioration and spoilage of the food. Referring to FIG. 5, one of the sealing portions 31 of the seal member 3 is separated from the bottom holes 111 of the base wall 11 for drainage of the water out of the accommodation space. In actual use, both of the sealing portions 31 of the seal member 3 may be separated from the bottom holes 111 for drainage of the water.

Figure 6:
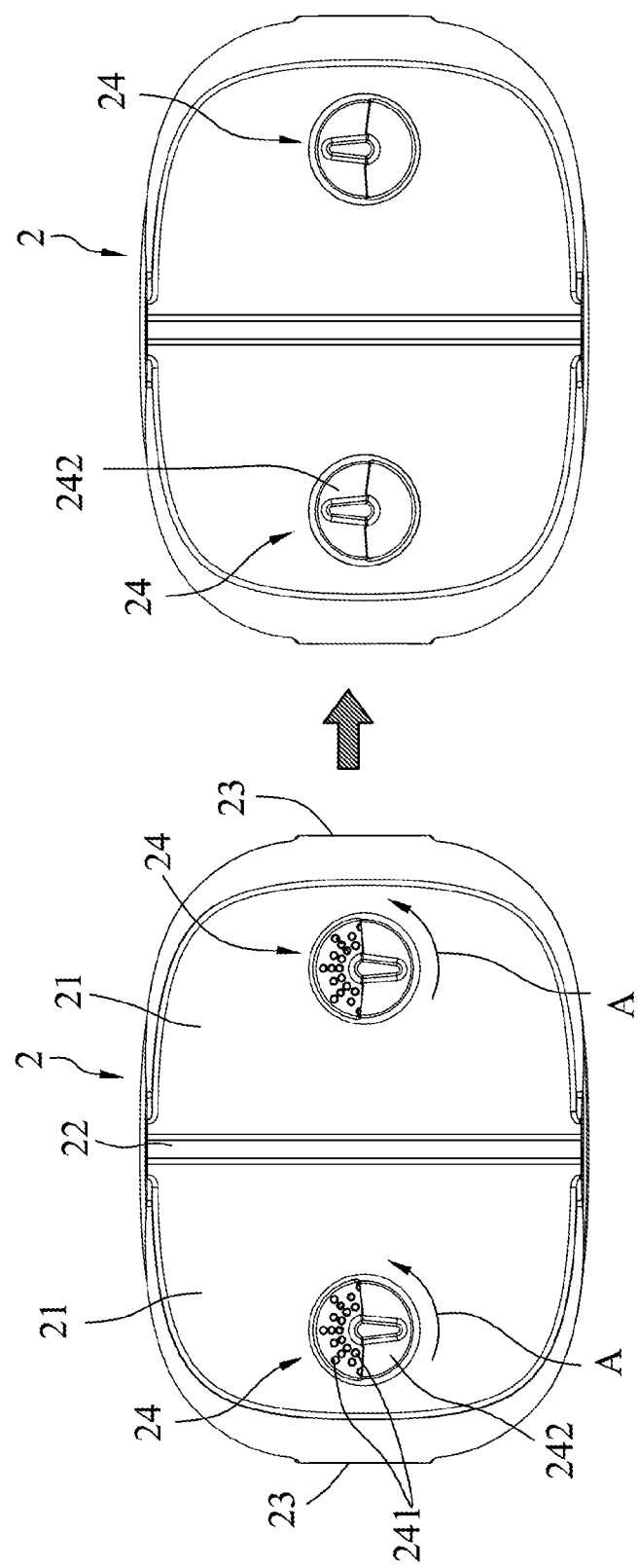
FIG. 6 is a top view of the first embodiment, illustrating transition of two vent-covering members of the lid from a non-covering position to a covering position.

Referring to FIGS. 2 and 6, the ventilation control units 24 can be operated to control spatial communication between the accommodating space 10 and the ambient environment. Each vent-covering member 242 can be rotated in a rotational direction (as indicated by arrow (A) in FIG. 6) relative to the respective one of the covering sections 21 to move from a non-covering position to a covering position. When each vent-covering member 242 is at the non-covering position, the vent-covering member 242 uncovers the air vents 241 to spatially communicate the accommodating space 10 with the ambient environment. When each vent-covering member 242 is at the covering position, the vent-covering member 242 covers the air vents 241 to block spatial communication between the accommodating space 10 and the ambient environment. In this way, each vent-covering member 242 can be moved to the non-covering position for storing food that requires ventilation, and can be moved to the covering position for preventing food from fresh air contact.

In addition, as shown in FIG. 4, when it is desired to divide the accommodating space 10 into left and right compartments 102, the dividing member 5 can be folded and vertically inserted into the slit 42 of the support plate 4 so as to position the dividing member 5 at the second position. As such, different kinds of food can be respectively placed into the compartments 102, and each can be taken out from the respective compartment by selectively flipping open a corresponding one of the covering sections 21.

In summary, by virtue of the configuration of the covering sections 21, the lid 2 does not have to be completely separated from the container body 1 for removing the food out of the compartments 102. Such design not only provides convenience in use, but also permits the food to have minimal fresh air contact, thereby contributing to maintaining freshness of the food. The storage container of the disclosure can be used to store food that requires refrigeration, or food that is typically stored at ambient temperature such as seasonings, garlic, ginger, pepper, onion, or potatoes, etc. In this embodiment, the container body 1 and the lid 2 are substantially rectangular in shape with curved corners. It is worth mentioning that the color of the lid 2 may be different from that of the container body 1. Such dual-color design and the curvature of the container body 1 and the lid 2 provide aesthetic appeal to the storage container, and the storage container can be put on a kitchen benchtop for decoration purpose.

Figure 7:
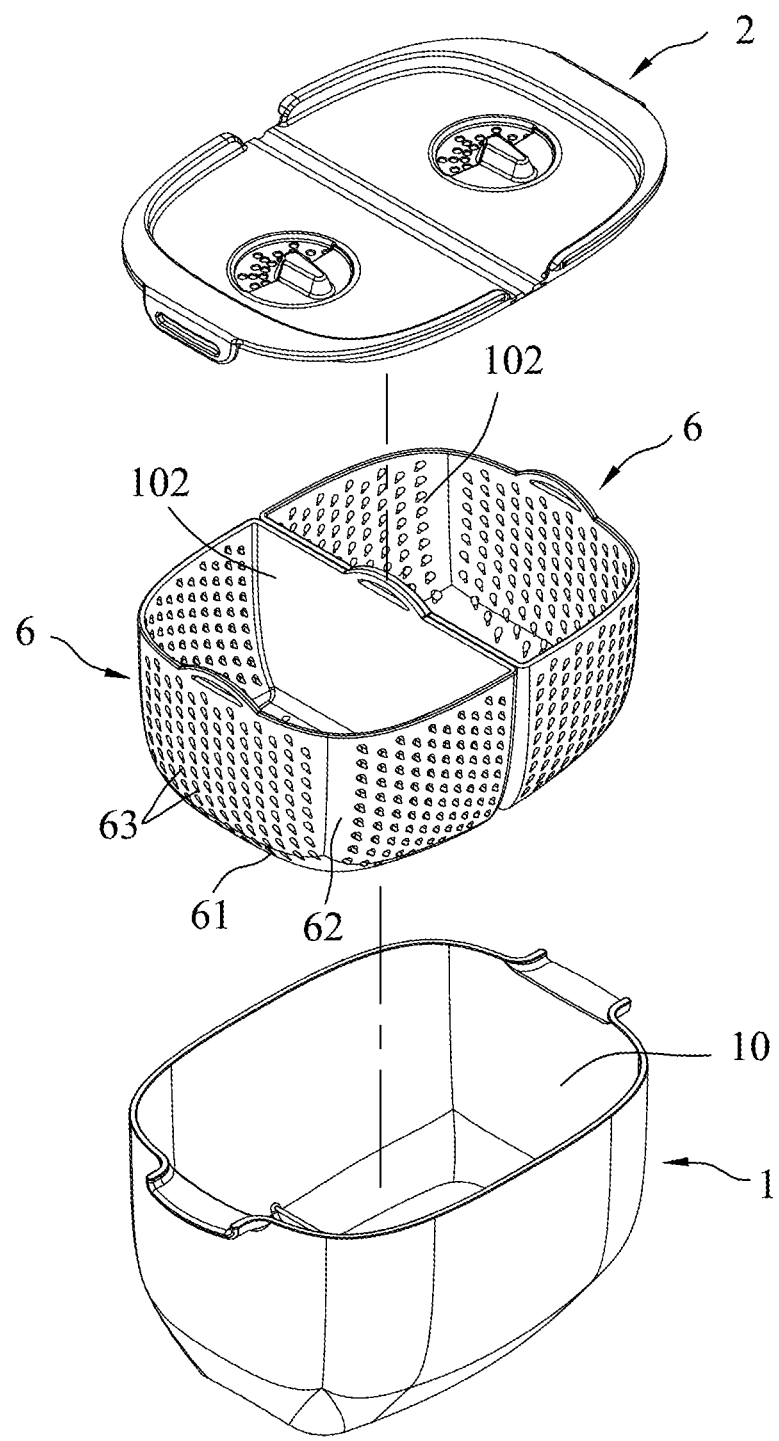
FIG. 7 is an exploded perspective view illustrating a second embodiment of the storage container according to the disclosure.
Figure 8:
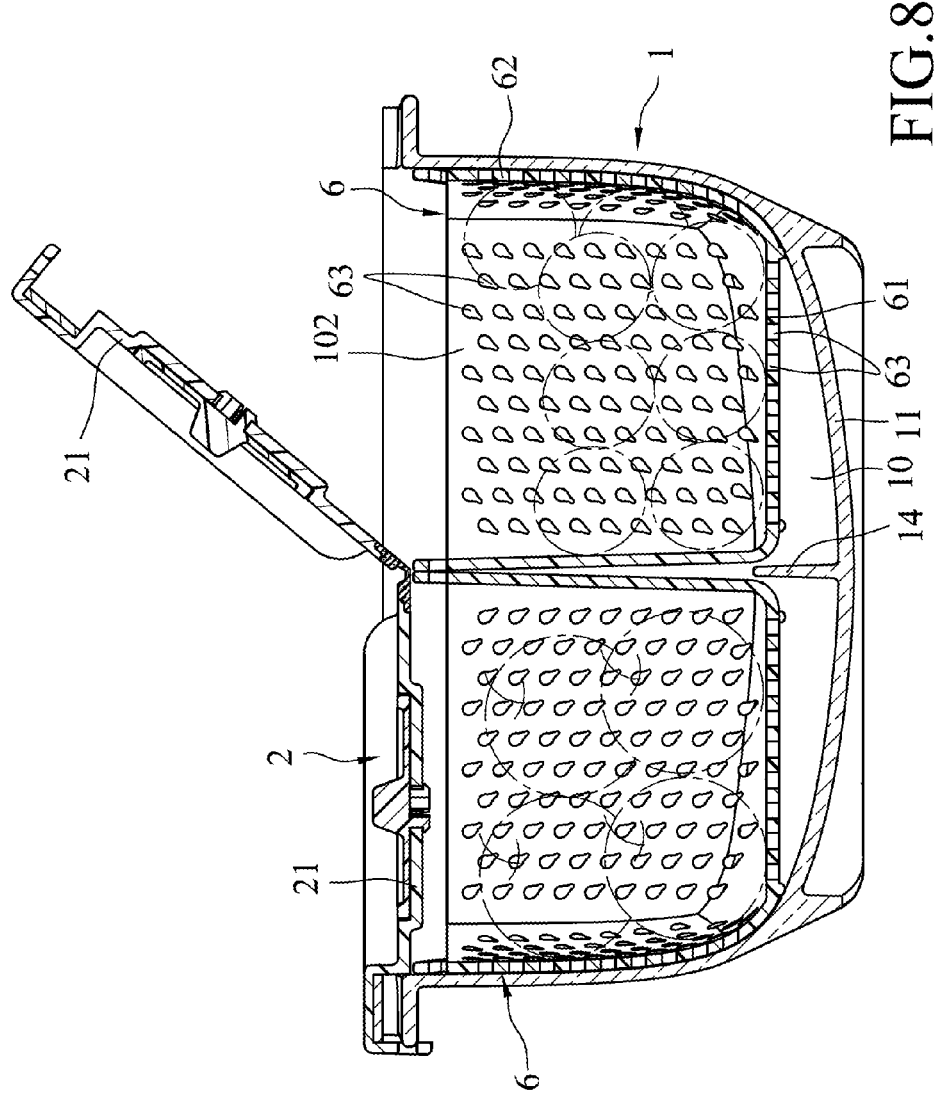
FIG. 8 is a sectional side view of the second embodiment.

Referring to FIGS. 7 and 8, a second embodiment of the storage container according to the disclosure is similar to the first embodiment. The difference between the first and second embodiments resides in the structure of the dividing member 5. The support plate 4 and the seal member 3 (see FIG. 1) are omitted in the second embodiment. The dividing member 5 of the second embodiment includes two baskets 6 that are removably disposed in the accommodating space 10 and that are adjacent to each other to respectively define the compartments 102. Each of the baskets 6 has a bottom 61, a peripheral wall 62, and a plurality of liquid passage holes 63. The peripheral wall 62 extends upwardly from a periphery of the bottom 61 and cooperates with the bottom 61 to define a respective one of the compartments 102 which has a top opening corresponding in position to a respective one of the covering sections 21 of the lid 2. The liquid passage holes 63 extend through the bottom 61 and the peripheral wall 62, such that water from the food stored in the compartments 102 can drip down onto the base wall 11 through the liquid passage holes 63. The container body 1 of the second embodiment further includes a partition wall 14 that protrudes upward from a center of the base wall 11 so that the baskets 6 are disposed at two lateral sides of the partition wall 14, respectively. Different kinds of food can be respectively placed into the baskets 6, and each of the baskets 6 can be taken out from the container body 1 individually for removing the food in the respective compartment all at once.

Figure 9:
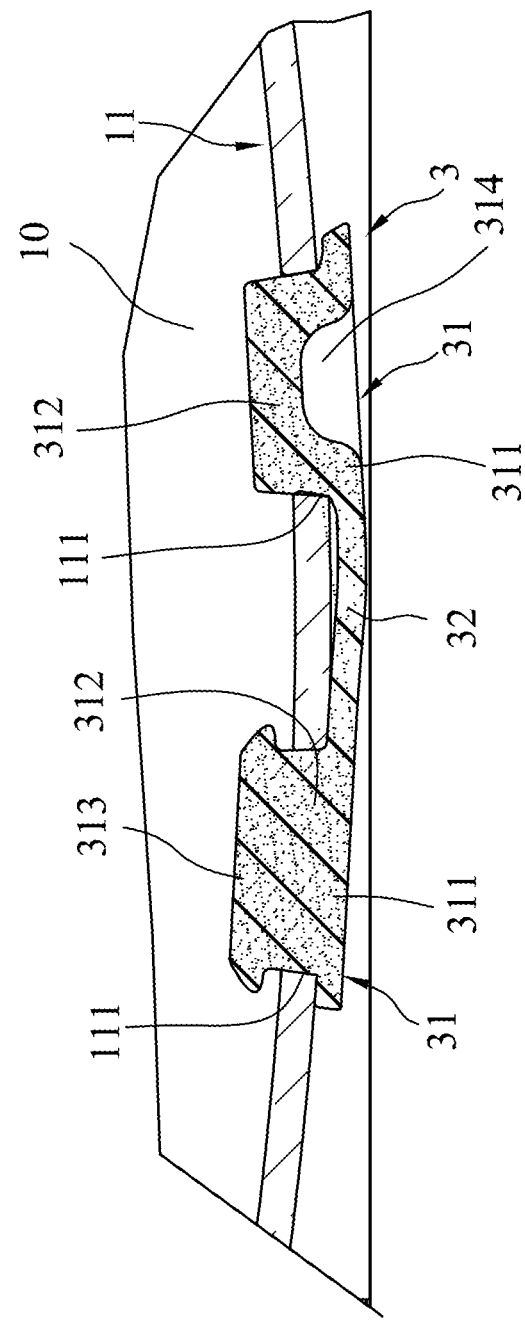
FIG. 9 is an enlarged sectional view of a modification of the seal member of the first embodiment.

FIG. 9 illustrates a modification of the seal member 3 of the first embodiment with only one of the sealing portions 31 being easily separable from the respective one of the bottom holes 111, which prevents the seal member 3 from missing. Each of the sealing portions 31 of the seal member 3 in FIG. 9 has a bottom segment 311, and a sealing segment 312 extending from the bottom segment 311 into a respective one of the bottom holes 111 for sealingly covering the respective one of the bottom holes 111. One of the sealing portions 31 further has a retaining segment 313 connected to the sealing segment 312 and being frusto-conical in shape, such that the retaining segment 313 functions as a hook for preventing the one of the sealing portions 31 from being easily separated out from the respective one of the bottom holes 111. The other one of the sealing portions 31 is formed with a recess 314 recessed from a bottom surface of the bottom segment 311. Such configuration enables a user to quickly identify the sealing portion 31 with the recess 314 for drainage of the water out of the accommodating space 10, which can be done simply by touching and feeling the indentation of the recess 314.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A storage container comprising:
    a container body (1) defining an accommodating space (10) that has a top opening (101);
    a lid (2) removably disposed on said container body, and having two covering sections (21) that cooperatively cover said opening, each one of said covering sections being independently operable to uncover a part of said opening; and
    a dividing member (5) removably disposed in said accommodating space for dividing said accommodating space into two compartments (102),
    wherein said dividing member is configured as a plate, and has two plate sections (51) that are connected to each other such that said dividing member is foldable in a manner that said plate sections overlap each other, said dividing member being displaceable between a first position, where said dividing member extends horizontally in said accommodating space such that said compartments are respectively formed on top and bottom sides of said dividing member, and a second position, where said dividing member is folded and is vertically disposed in said accommodating space such that said compartments are respectively formed on two lateral sides of said dividing member.

2. The storage container as claimed in claim 1, wherein said lid further has a flexible connecting strip (22) that interconnects said covering sections such that each of said covering sections can be flipped open relative to said connecting strip.

3. The storage container as claimed in claim 1, wherein said dividing member is configured as a plate and extends horizontally in said accommodating space such that said compartments are respectively formed on top and bottom sides of said dividing member.

4. The storage container as claimed in claim 3, wherein said dividing member is formed with a plurality of perforations (52) that spatially communicate said compartments.

5. The storage container as claimed in claim 3, wherein said dividing member is formed with an extending hole (53) for access of a user's finger to remove said dividing member out of said accommodating space.

6. The storage container as claimed in claim 1, wherein said dividing member is formed with a plurality of perforations (52) that spatially communicate said compartments when said dividing member is at the first position.

7. The storage container as claimed in claim 1, wherein said dividing member is formed with an extending hole (53) at an intersection of said plate sections for access of a user's finger to remove said dividing member out of said accommodating space when said dividing member is at the first position.

8. The storage container as claimed in claim 1, further comprising a support plate (4) extending horizontally in said accommodating space, and being formed with a slit (42)

through which said dividing member vertically extends when said dividing member is at the second position.

9. The storage container as claimed in claim 8, wherein said container body includes an inner protrusion (121) formed on an inner surface of said container body for supporting said dividing member to be at the first position.

10. The storage container as claimed in claim 1, wherein said container body includes an inner protrusion (121) formed on an inner surface of said container body for supporting said dividing member to be at the first position.

11. The storage container as claimed in claim 1, wherein:
   said container body includes a base wall (11) that has a bottom hole extending through top and bottom surfaces of said base wall, and a surrounding wall (12) that extends upwardly from said base wall and that cooperates with said base wall to define said accommodating space; and
   said storage container further includes a seal member (3) removably and sealingly covering said bottom hole.

12. The storage container as claimed in claim 11, further comprising a support plate disposed above said base wall, extending horizontally in said accommodating space, and being formed with a plurality of through holes (41) that extend through top and bottom surfaces of said support plate.

\* \* \* \* \*